United States Patent [19]

Kinsey

[11] Patent Number: 4,474,529

[45] Date of Patent: Oct. 2, 1984

[54] WINDMILL

[76] Inventor: Lewis R. Kinsey, 108 S. 25th St., Phoenix, Ariz. 85034

[21] Appl. No.: 477,174

[22] Filed: Mar. 21, 1983

[51] Int. Cl.³ .............................................. F03D 7/06
[52] U.S. Cl. ...................................... 415/2 R; 415/4
[58] Field of Search ....................... 415/2 R, 3 R, 4 R

[56] References Cited

U.S. PATENT DOCUMENTS

| | | | |
|---|---|---|---|
| 547,954 | 10/1895 | Irwin | 415/2 R |
| 1,143,803 | 6/1915 | Benbow | 415/4 R |
| 1,193,310 | 8/1916 | Tarr | 415/4 R |
| 1,460,114 | 6/1923 | Shelton | 415/4 R |
| 1,812,400 | 6/1931 | Gilley | 415/4 R |
| 2,240,290 | 4/1941 | Du Brie | 415/4 R |
| 3,246,862 | 4/1966 | Celniker et al. | 416/162 X |
| 4,318,019 | 3/1982 | Teasley et al. | 310/156 |

FOREIGN PATENT DOCUMENTS

| | | | |
|---|---|---|---|
| 821930 | 11/1951 | Fed. Rep. of Germany | 416/197 A |
| 1916460 | 10/1970 | Fed. Rep. of Germany | 416/197 A |
| 2460075 | 1/1976 | Fed. Rep. of Germany | 416/197 A |
| 554801 | 6/1923 | France | 415/3 R |
| 2442979 | 8/1960 | France | 416/197 A |

Primary Examiner—Everette A. Powell, Jr.
Attorney, Agent, or Firm—Warren F. B. Lindsley

[57] ABSTRACT

A wind turbine journaled on a support for rotation about a substantially vertically positioned axis and employing trough-like vanes spacedly positioned around the axis and extending longitudinally thereof. A windshield is rotatively mounted on the support for surrounding and shielding at least a part of the vanes, which windshield is adjustively positioned relative to the wind to compensate for high wind speeds and resulting wind damage to the turbine.

6 Claims, 10 Drawing Figures

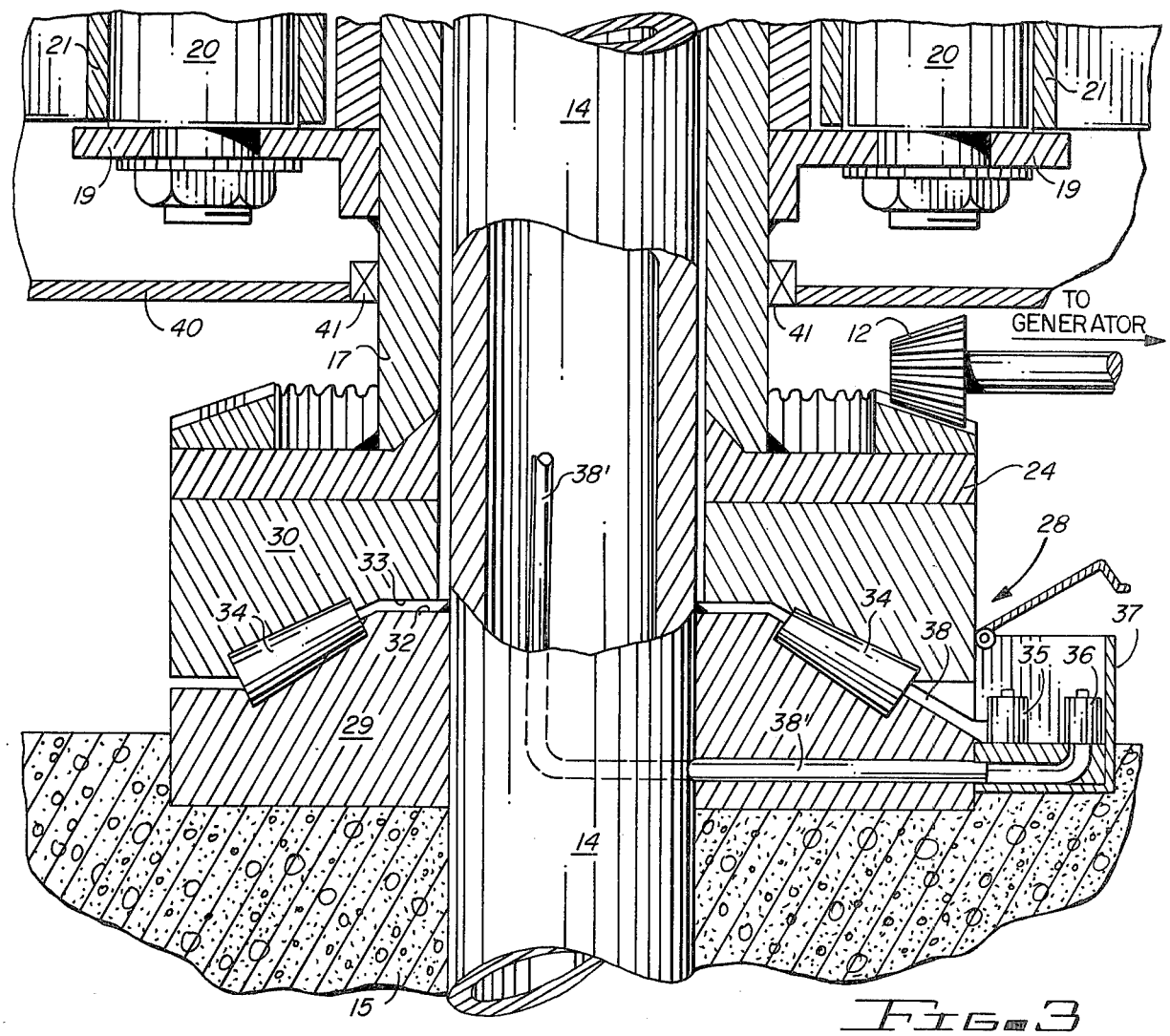
FIG. 3
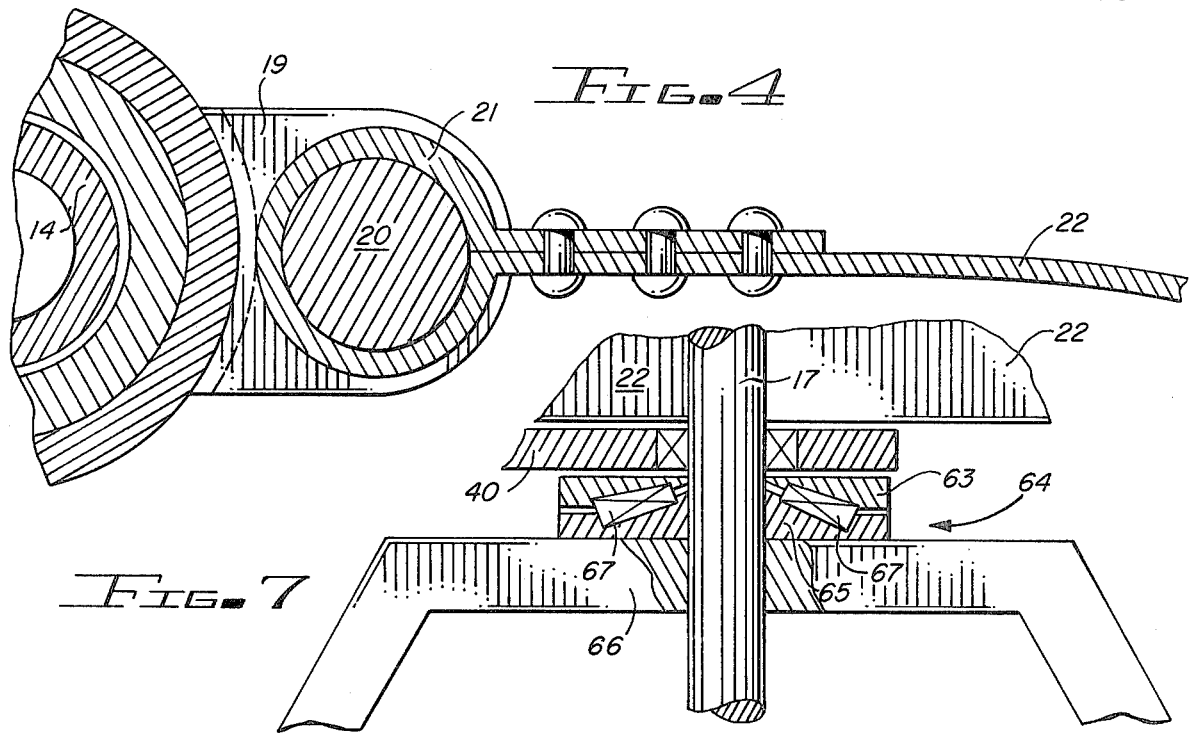
FIG. 4
FIG. 7

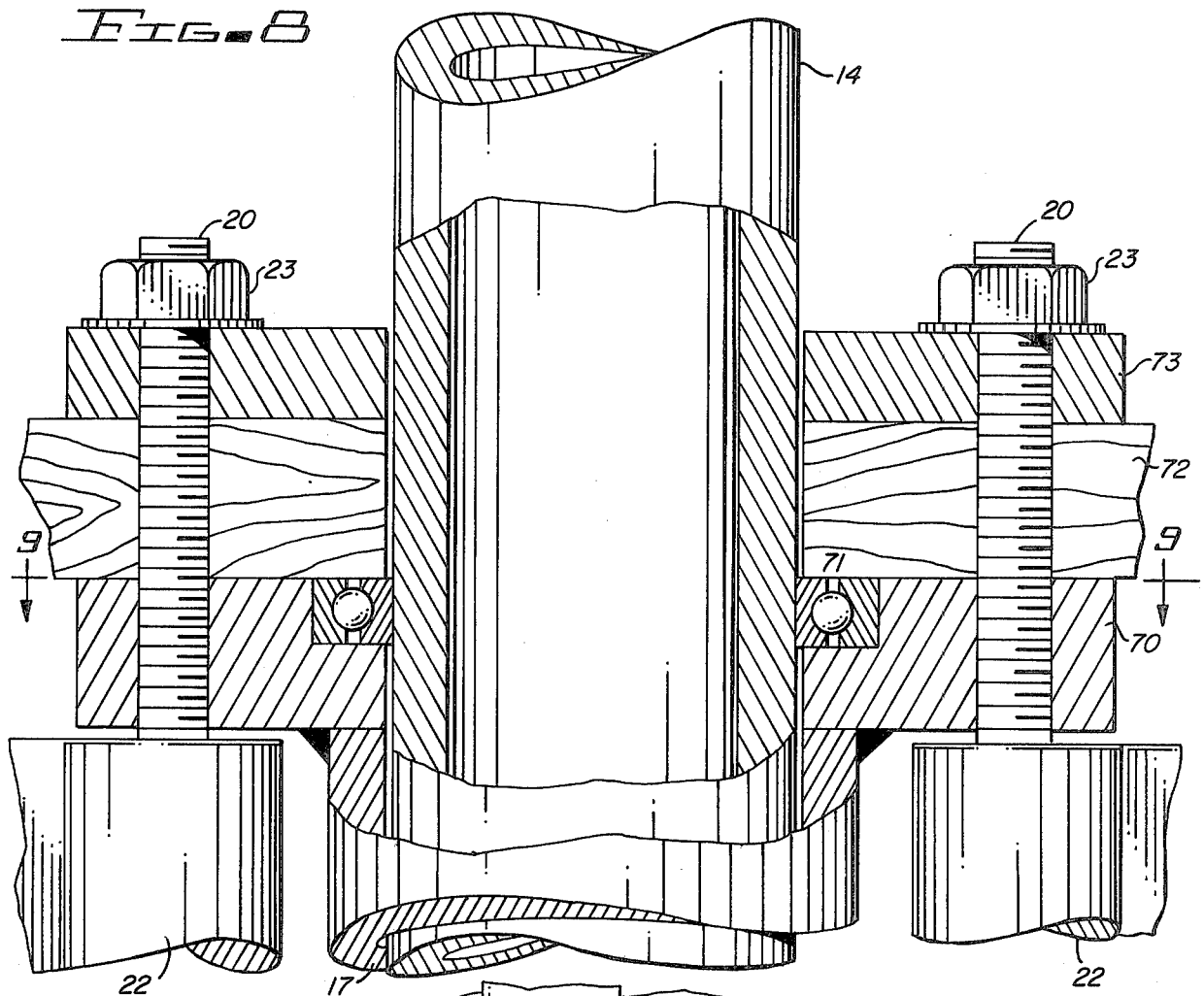
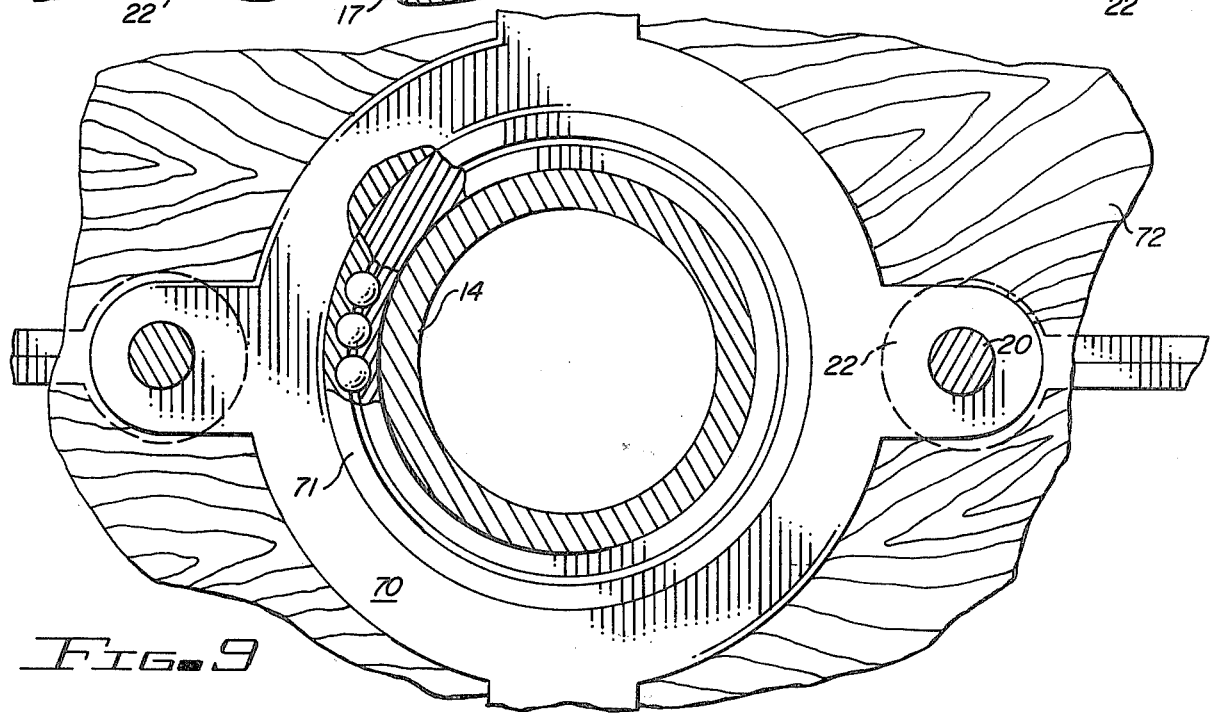

WINDMILL

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability and the high cost of fuels such as oil and natural gas. Most countries in the world today do not have adequate sources of these fuels within their own boundaries and are dependent upon foreign sources.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and the resulting research in many fields of energy, one source of energy which is readily available to every country in the world in virtually unlimited quantities stands out. This virtually untapped source is wind energy.

The interest in this almost boundless resource and in its development and harnessing for use in homes and factories is rising as other resources dwindle. Its desirability is further enhanced by the fact that wind energy may be converted to practical use without the hazard of environmental contamination.

History does not record the date of the invention of windmills; i.e., the first land uses of wind movement, but it is known that a wind-powered water lift was used in Persia about 600 B.C. During the 12th century A.D., windmills appeared in Europe where they were used to grind grain and pump water.

A great number of different sizes and designs of windmills have been built in the past for useful purposes, but few designers have effectively utilized the laws of physics in their designs. One particular design employing a single type propeller blade vertically positioned has been used but its design negates the known principles of the old sailing ships that the more square feet of sail surface used, the more power absorbed from the wind.

Thus, it is apparent that the key factor to good wind turbine design involves the controlled exposure of the maximum amount of blade surface to the wind.

In order to increase the effectiveness of hardware necessary to harness wind movement, it is necessary to create a wind energy system which will increase the amount of surface exposed to the wind yet function at wind currents as low as 7-10 miles per hour velocity and at speeds reaching their maximum velocities. A simple and economical shielding device requiring little maintenance and upkeep activities is employed which will control the speed of the windmill causing it to operate within selected speed ranges. Such a system requires a new and novel windmill or wind turbine for effective operation with the modern day electric alternators.

DESCRIPTION OF THE PRIOR ART

Heretofore windmills and wind turbines have been utilized to harness wind energy generated by varying solar conditions for useful purposes.

None are known which employ the wind shielding and control means disclosed herein, for maintaining a safe and efficient operating range of rotation of a wind turbine.

U.S. Pat. No. 4,318,019 discloses an alternator for wind generators which employs a louvered wind turbine.

SUMMARY OF THE INVENTION

In accordance with the invention claimed, a new and improved wind energy system is disclosed employing a novel windmill or wind turbine.

It is, therefore, one object of this invention to provide a new and improved wind energizing system.

Another object of this invention is to provide a new and improved windmill and/or wind turbine design.

A further object of this invention is to provide an improved windmill and/or wind turbine design which is simple in construction, low in cost and capable of operating at varying low and relatively high wind conditions.

A still further object of this invention is to provide improved means for selectively shielding the blades of the windmill or turbine to automatically control its speed of rotation under various wind conditions.

A still further object of this invention is to provide a new and improved method and means for generating electricity from a varying wind source employing a unique windmill or turbine.

A still further object of this invention is to provide an improved wind energy system which increases the blade surface exposed to the wind over known structures, thereby generating more power for the same wind velocity with a smaller compact and economically produced structure than heretofore possible.

Yet another object of this invention is to provide a new and improved wind generator with an automatic over speed control.

Further objects and advantages of the invention will become more apparent as the following description proceeds and the features of novelty which characterize this invention will be pointed out with particularity in the claims annexed to and forming part of this application.

BRIEF DESCRIPTION OF THE DRAWINGS

The present invention may be more readily described by reference to the accompanying drawings, in which:

FIG. 3 is a cross-sectional view of FIG. 1 taken along the line 3—3 and illustrating the bottom main bearing;

FIG. 4 is a view partially in cross-section of the structure for attaching the fins of the windmill or turbine to the rotating post mounted ring;

FIGS. 6A and 6B are partial views showing the mechanism for moving the windshield in two different operating positions;

FIG. 7 is a modification of the base mounting means of the windmill or turbine shown in FIG. 1;

FIG. 8 is a partial view of a modification of the structure shown in FIG. 1 for clamping and holding the tops of the vanes in a journaled arrangement around the fixed pole; and FIG. 9 is a cross-sectional view of FIG. 8 taken along the line 9—9.

DESCRIPTION OF THE PREFERRED EMBODIMENT

Referring more particularly to the drawings by characters of reference, FIGS. 1-6 disclose a wind energy apparatus or device 10 comprising a windmill or turbine 11 hereinafter referred to as turbine which may be connected through a gear means 12 to a generator or alternator (not shown).

Figure 1:
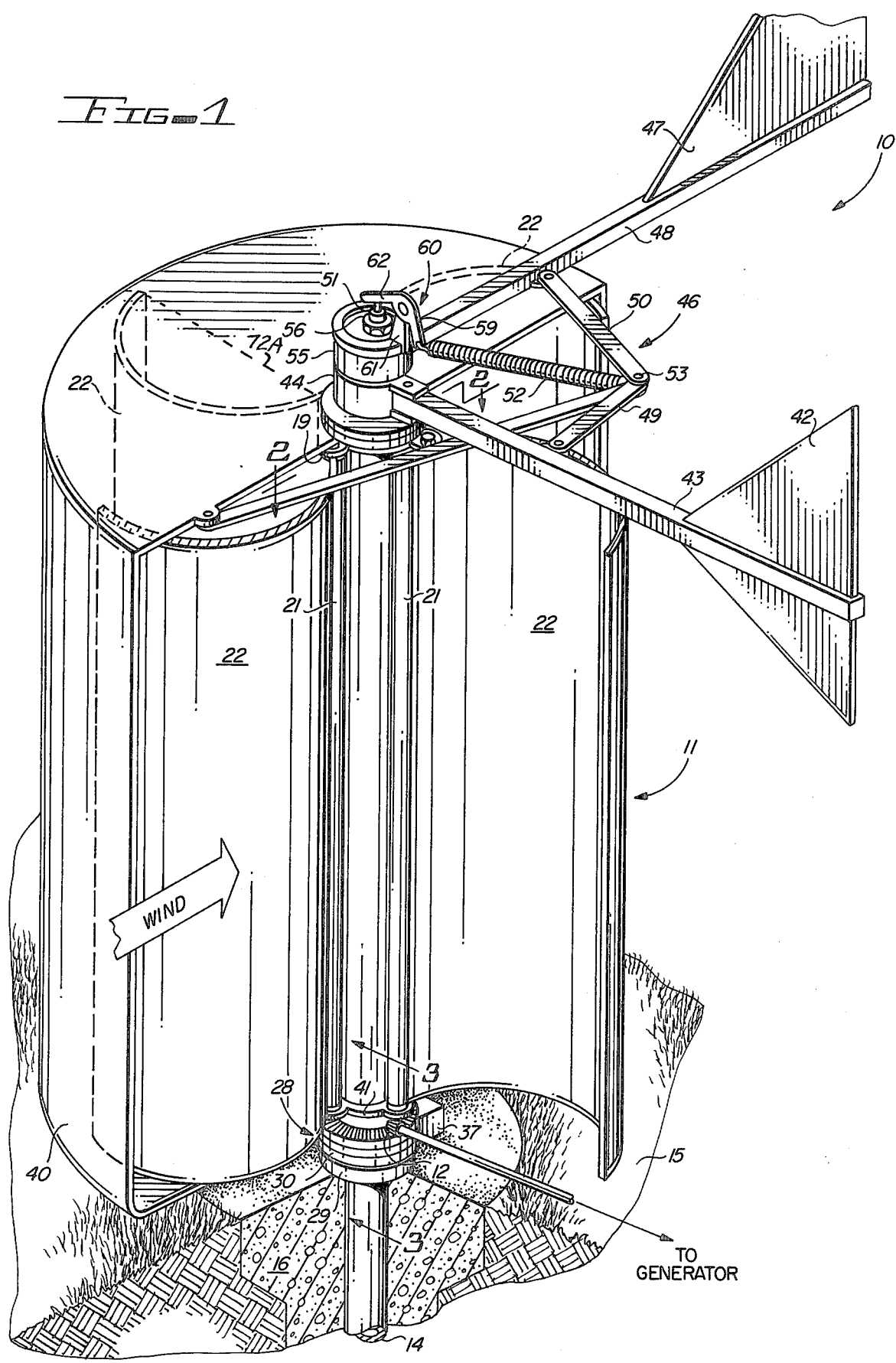
FIG. 1 is a perspective view of a windmill or turbine embodying the invention.

Turbine 11 comprises a horizontally rotating vertical axis turbine-type rotor structure mounted around a support member such as a fixed pole 14 which is tubular in form, one end of which is fixedly secured such as by anchoring in ground 15 by means of concrete 16, as shown in FIG. 1.

A hollow tubular pipe or shaft 17 is coaxially mounted around pole 14 and journaled for rotation thereabout. Member 17 has clamped therearound a split tubular shaft 18 comprising portions 18A and 18B. The tubular shaft is provided at each end thereof with a plurality of laterally extending brackets 19 arranged in a planar equally spaced arrangement around member 17 for receiving in an aperture or hole 19A extending therethrough like ends of posts 20. Posts 20 are used for securing in axial alignment the turned over edge 21 of arcuate shaped vanes 22.

Vanes 22 are spacedly arranged around the circumference of shaft 17 in the manner shown in FIG. 1 and each are arcuately shaped to form a cup or trough shaped semi-circular configuration for capturing the wind impinging within the concave configuration.

The inner edge of the vanes are also turned back on themselves, as shown in FIG. 4, for receiving therein posts 20 for firming up and maintaining the vanes in a given arcuate configuration.

Vanes 22, which may be formed of aluminum sheets, are notched at both their top and bottom ends and bent over to a ninety degree angle, as shown in FIG. 1, in order to form fastening flanges. These flanges are used for batting the vanes to top and bottom rotor plates, as shown in FIGS. 8 and 9, for added rigidity. The flanges on each end of the vanes may be covered by a curved metal strip.

Figure 5:
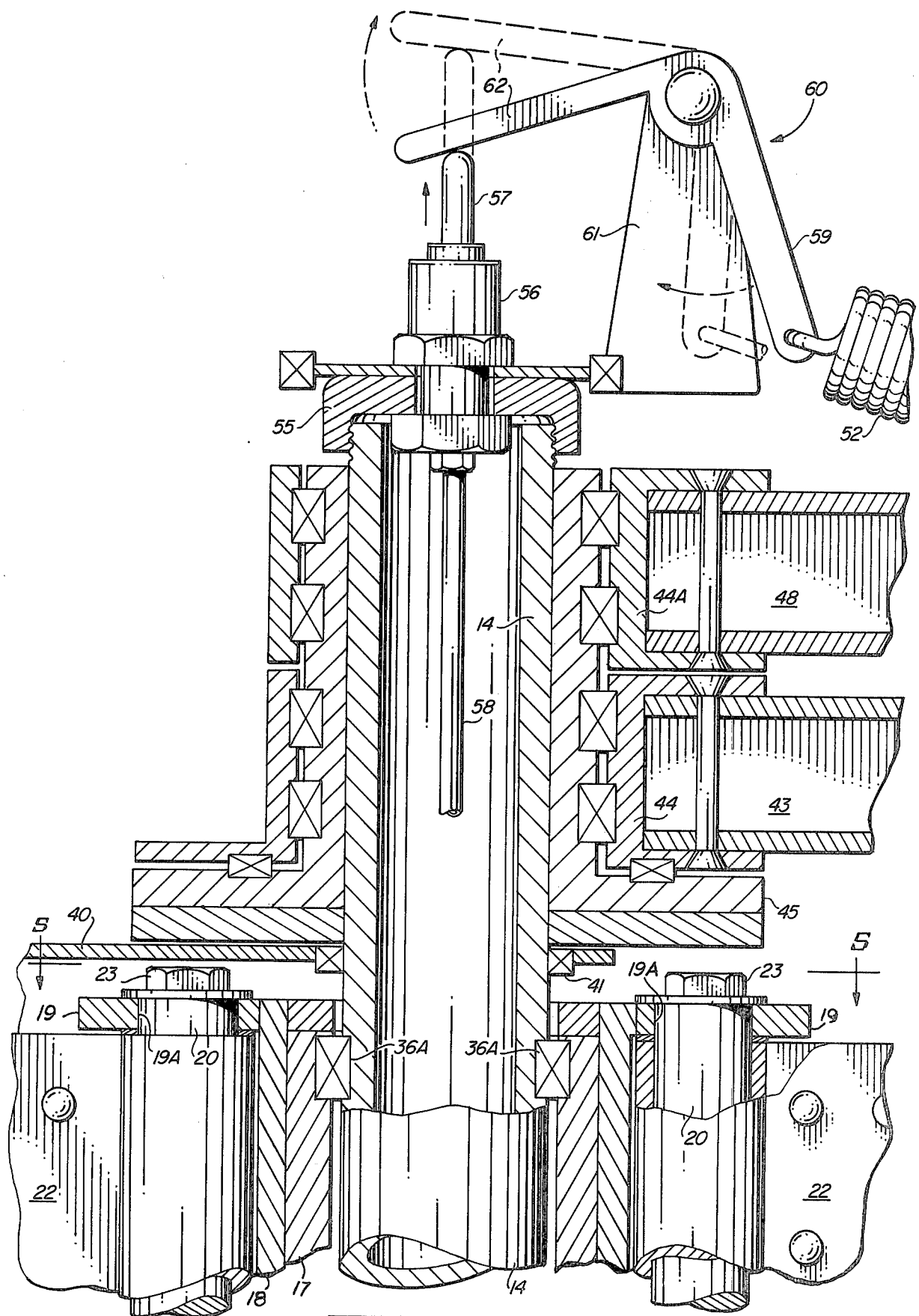
FIG. 5 is an enlarged view partially in cross-section of the top of the windmill or turbine shown in FIG. 1 with the automatic speed control shown in more detail.

The wind turbine shown in FIG. 1 is provided with four vertical vanes 22 all formed with similar concave or trough-like configurations with the edges and ends turned over on themselves for strength. The concave or trough-like section extends the full length of the vanes. FIG. 5 illustrates that suitable nuts 23 may be used to threadedly secure bolts posts 20 to bracket 19 at the top of shaft member 17.

Figure 2:
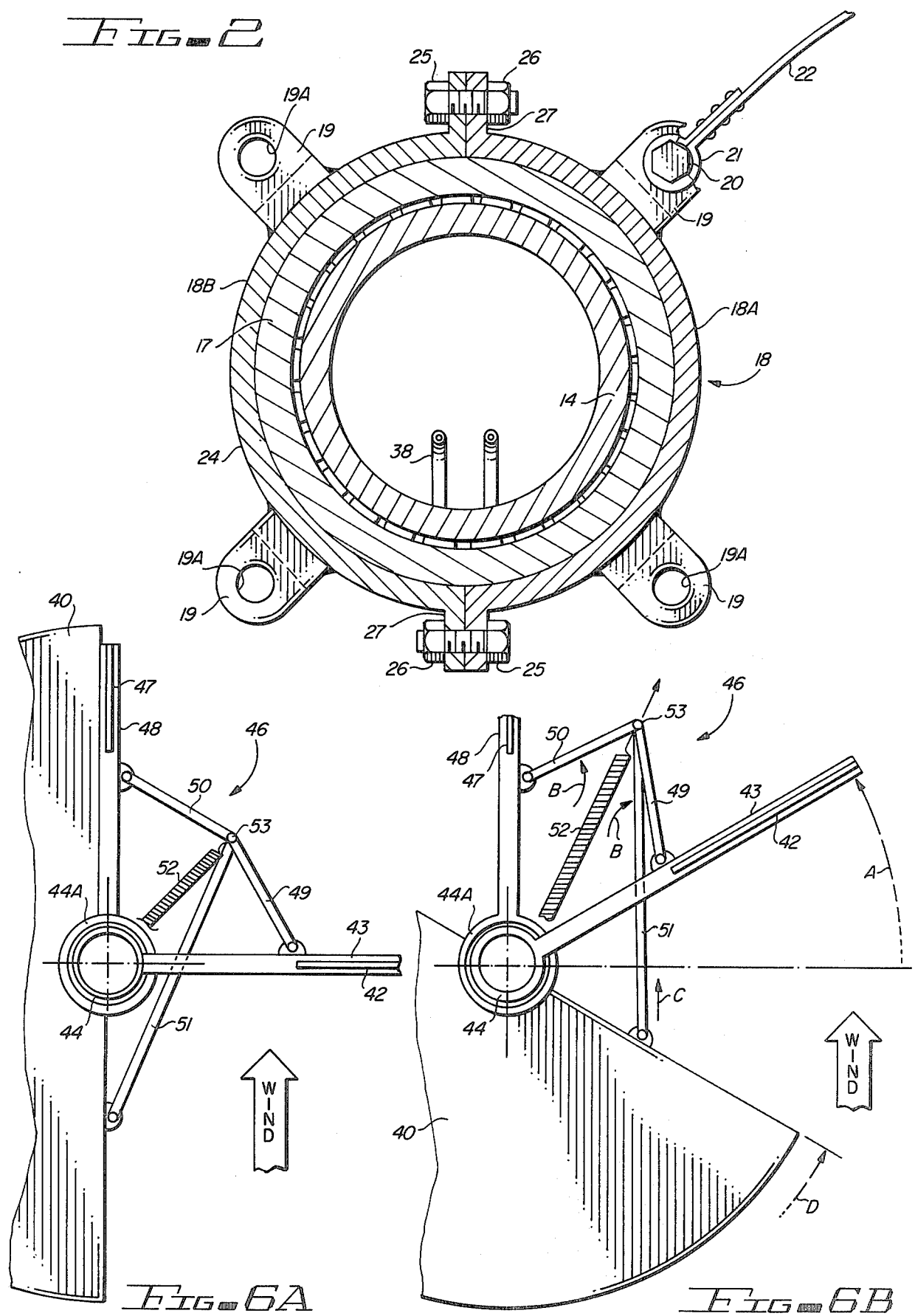
FIG. 2 is a cross-sectional view of FIG. 1 taken along the line 2—2.

FIG. 2 illustrates that portions 18A and 18B are camped by bolts and nuts 25 and 26 extending through flanges 27 of portions 18A and 18B of sleeve 18 to shaft 17 and transmit the power or force of the wind impinging on the troughs of vanes to member 17 thereby forming a wind operated rotor assembly.

The lower end of the rotor assembly is mounted on a roller bearing assembly 28 comprising a fixed ring 29 at least partially embodied in concrete 15 and a movable outer ring 30 fixedly secured to plate 24. Rings 29 and 30 form a plurality of raceways between their juxtapositioned surfaces 32 and 33 within which tapered roller bearings 34 revolve in a known manner.

For most installations, the main rotor will be mounted on a fixed flange on the power pole located several feet above the bottom main roller bearing in order to give plenty of room for the power take-off structure positioned under the rotor.

The tapered bearing is preferred and when assembled as shown, absorbs weight and radial loads combined through rolling action of the bearings.

These antifriction bearings require lubrication, although the amount of lubrication is much less than that supplied to a plain bearing. As shown in FIG. 3, a ZERK grease fitting 35 is used to grease the bottom bearing assembly 28 with a similar fitting 36 used to grease the upper vertically positioned bearing 36A of the rotor assembly. Both of the ZERK grease fittings may be mounted in a covered box 37 mounted at the base of the wind turbine and connected to their respective bearings by passageways 38 and 38' respectively.

Gear means 12 is a simple and conventional gearing arrangement for gearing up or down the relative rotation of the wind turbine 11 relative to the associated generator or alternator. This is only a suggested power take-off position and for simplicity it is shown open and exposed.

The wind turbine disclosed is operable at low wind speeds such as 4 to 8 miles per hour with best operating speeds around 10 to 28 miles per hour. Although during times when the wind speeds are greater than 42-50 miles per hour and most propeller driven windmills are inoperative, the wind turbine disclosed will operate effectively. At this point, the maximum amount of wind entering the turbine has been obtained and the excess wind begins to flow around the turbine thereby eliminating the possibility of a "runaway" turbine and possible destruction thereof.

In order to control the speed of operation of the wind turbine, a windshield 40 is rotatively mounted on fixed pole 14 so as to be adjustively positioned relative to vanes 22 forming the rotor assembly. Windshield 40 comprises a closed-ended semi-cylindrical structure that fits half-way around the complete rotor within which the vanes may rotate, as shown in FIG. 1, and is fastened to pole 14 above and below vanes 22 by sealed bearings 41.

The windshield is rotatively positioned by a fantail 42, the supporting arm 43 of which is suitably held in a sleeve 44 which is journaled by a collar 45 to the upper end of pole 14, as shown in FIG. 5. This fantail automatically moves to position the windshield to uncover, expose and direct the rotor into the wind.

An automatic control mechanism 46 in FIG. 1 is provided to protect turbine 11 against sudden gusts of wind or wind speeds that cause "runaway" and destruction of the turbine mechanism.

This mechanism comprises a fantail 47 connected by a rod 48 to a sleeve 44A which is journaled by collar 45 to the upper end of pole 14, as shown in FIG. 5. The control mechanism 46 further comprises a pair of lever arms 49 and 50 shown in FIGS. 1, 6A and 6B, which are pivotally connected together at a common end and pivotally connected at their other ends, one to supporting arm 43 and the other to supporting arm 48 of fantails 42 and 47, respectively. A connecting rod 51 is pivotally connected at one end to the pivotal connection of lever arms 49 and 50 and at the other end to windshield 40 at a point on the windshield diagonally opposite from the position of fantail 47. A spring 52 is connected between the pivotal connection 43 of lever arms 49 and 50 and the other end is connected to one leg of a right angular lever arm 60 shown in FIGS. 1 and 5.

In all normal operations fantail 47 will extend outwardly and backwardly of the apparatus acting as a tail for the structure with fantail 43 extending outwardly of the right side of the apparatus and across the direction of the wind. As the speed and force of the wind increases, fantail 42 is pressed further backward in the direction of the wind overcoming the tension of spring 52 and jackknifing or folding together the lever arms 49 and 50 in the manner shown in FIGS. 6A and 6B. This folding action actuates rod 51 which is fastened at one end to the windshield causing it to rotate counterclockwise. This action covers more of the exposed vanes 22 thereby reducing the effects of the wind gusts on the wind turbine. The stronger the wind blows, the farther back the small fantail 42 is moved with the resulting larger coverage of the wind vanes occurring. The results of this action reduce the effective wind pressure on the vanes. Thus, an equalizing effect occurs between the resulting positions of fantails 42 and 47 and the equalizing pressure of spring 52, all occurring automatically with the structure disclosed. Spring 52 during this action is expanded under tension and, upon reduction of the wind speed, causes the windshield to rotate clockwise back to its original position regulated by the average wind speed at that time on fantail 42.

FIG. 5 further illustrates a hydraulic means which may be utilized for adjustably setting the tension on spring 52 so as to modify the amount of wind pressure necessary for moving windshield 40 around the rotor structure of turbine 11.

As shown, a cap 55 is threadedly attached to the top of pole 14 which cap has mounted thereto a hydraulic cylinder 56. The hydraulic cylinder comprises a piston rod 57 mounted therein which is actuated longitudinally of pole 14 against the biasing action of a spring and fluid under pressure transmitted thereto by pressure line 58. This is the same spring that controls the directional movement of fantail 42.

Spring 52 is connected to one leg 59 of a right angular lever arm 60 which is rotatively mounted on a support bracket 61 which is attached to a bearing on the top of the fixed pole 14. The other arm 62 of the lever arm 60 extends over the end of piston rod 57 such that when piston rod 57 is actuated outwardly by fluid under pressure in the hydraulic cylinder, lever arm 60 is rotated clockwise thereby expanding spring 52. This action requires a greater wind pressure on fantail 42 to move shield 40 counterclockwise. Thus, the hydraulic cylinder 56 provides a means for adjusting and controlling the movement of windshield 40 from the base or at a position remote from the rotor of device 10. By reducing the fluid pressure in line 58, piston rod 57 is retracted.

FIG. 7 illustrates another way of mounting turbine 11. As shown, sleeve 17 may be attached to ring 63 of a bearing assembly 64 with another cooperating ring 65 of the bearing assembly secured to the top of a platform 66. Bearings 67 are mounted in a raceway formed in juxtapositioned surfaces of rings 63 and 65.

FIGS. 8 and 9 illustrate a further modification of the structure shown in FIG. 1 wherein a simpler and more economical top assembly of the turbine structure is shown. As noted, the upper bearing assembly of FIG. 1 is replaced with a bearing plate 70 that has embodied therein a replaceable bearing assembly 71. Plate 70 is fixedly secured to the top of shaft 17. A suitable top plate 72 is mounted around the fixed pole 14 on top of bearing plate 70 and is utilized for covering the ends of the vanes 22 forming a part of the rotor assembly of the device.

For purposes of simplicity, top plate 72 has been shown only in FIGS. 8 and 9, but it should be noted that it is used to cover both ends of the vanes of the structure shown in FIG. 1. It is also herein disclosed that in place of a single plate 72 each end of the vanes may be closed individually by a plate 72A, shown in dash lines in FIG. 1 in place of plate 72 covering the total vane end structure.

A metal plate 73 is positioned between the top plate 72 and the washer and nut 23 assembly securing rods 20 in the rotor assembly.

The disclosed bearing plate 70 does not carry any weight of the main rotor structure of the turbine, but it effectively carries side thrusts occurring under high wind conditions.

FIGS. 8 and 9 eliminate the two piece outside tubular member that is clamped around the power pole where its primary job is to hold brackets 19 shown in FIG. 2. All four of these brackets are mounted on a single member giving it the shape shown in FIGS. 8 and 9 which structure is strong and trouble free. The top member is welded to the top of the power pole and it contains the top main bearing. Another similar member without a bearing is welded lower down on the power pole at the bottom of the rotor. The rotor must be mounted high enough above the bottom main bearing to give an adequate clearance for the power take-off drive.

Thus, a significantly improved wind turbine is provided in accordance with the stated objects of the invention with the position of the windshield controlled by the speed of the wind acting against the wind vanes and the coil spring tension. The greater the tension on the coil spring, the greater the allowable speed of the rotor with the coil spring tension regulated through a hydraulic system from the ground.

Although but a few embodiments of the invention have been illustrated and described, it will be apparent to those skilled in the art that various changes and modifications may be made therein without departing from the spirit of the invention or from the scope of the appended claims.

What is claimed is:
1. A wind turbine comprising:
a support means comprising a vertically mounted pole,
a rotor assembly comprising a shaft journaled on said support means for rotating therearound,
said assembly comprising a plurality of vanes vertically attached to said shaft and spacedly positioned around said shaft and extending longitudinally thereof for rotation therewith,
said vanes comprising an arcuate trough-like configuration closed at each end for capturing the wind impinging thereon,
a first bearing assembly mounted on said support means for journaling said rotor assembly at ground level, a second bearing assembly mounted on said support means for journaling said rotor assembly at its upper end, a windshield rotatively mounted on said support means for surrounding and shielding a part of the vanes of said rotor assembly from the wind, and means exposed to the wind and actuated thereby for automatically adjustively positioning said windshield relative to said vanes, said means comprising a pair of fantails, one of said fantails being connected to said support means for orientation relative to the direction of the wind, the other end of said fantails being connected to said support means for positioning laterally of the direction of the wind, lever means interconnecting said pair of fantails, said lever means comprising a pair of arms pivotally interconnected at their common ends and pivotally connected at their other ends one to each of said fantails, spring means interconnected between said common ends of said arms and said support means, and a rod pivotally connected at one end to said common ends of said arms and at the other end to said windshield, whereby when the wind gusts, it moves said other of said fantails causing said arms to jackknife toward each other and said rod to move said windshield relative to said vanes against the biasing action of said spring means.

2. The wind turbine set forth in claim 1 in further combination with:

adjustment means for varying the tension on said spring means.

3. The wind turbine set forth in claim 2 wherein:

said adjustment means comprises a hydraulic cylinder.

4. The wind turbine set forth in claim 3 wherein:

said means is mounted vertically above said rotor assembly, and said adjustment means is mounted adjacent the top of said pole.

5. The wind turbine set forth in claim 3 wherein:

said hydraulic cylinder comprises a piston rod extending vertically of said pole, and a lever arm pivotally mounted on said support means having one end positioned in the path of movement of said piston rod and the other arm connected to one end of said spring means, whereby movement of said piston rod outwardly of said hydraulic cylinder rotates said lever arm to tension said spring means.

6. The wind turbine set forth in claim 5 in further combination with:

a source of fluid under pressure connected to said hydraulic cylinder for actuation thereof.

* * * * *